United States Patent
Majima

(10) Patent No.: US 7,738,430 B2
(45) Date of Patent: *Jun. 15, 2010

(54) MOBILE COMMUNICATION SYSTEM, MOBILE COMMUNICATION METHOD, BASE STATION, AND MOBILE STATION

(75) Inventor: Taichi Majima, Yokohama (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/419,317

(22) Filed: Apr. 7, 2009

(65) Prior Publication Data

US 2009/0201893 A1 Aug. 13, 2009

Related U.S. Application Data

(62) Division of application No. 10/572,739, filed as application No. PCT/JP2004/014662 on Sep. 24, 2004, now Pat. No. 7,545,779.

(30) Foreign Application Priority Data

Sep. 25, 2003 (JP) ............................. 2003-334341

(51) Int. Cl.
H04W 72/00 (2009.01)
H04J 3/00 (2006.01)
(52) U.S. Cl. ........................................ 370/337; 455/450
(58) Field of Classification Search .................. 370/337, 370/340, 329, 341, 437, 328, 465; 455/428, 455/427, 450–453, 455, 464, 509, 516

See application file for complete search history.

(56) References Cited

U.S. PATENT DOCUMENTS 6,920,121 B2   7/2005   Tan (Continued)

FOREIGN PATENT DOCUMENTS

EP   0 912 016   4/1999

(Continued)

OTHER PUBLICATIONS

International Search Report of Sep. 24, 2004 for PCT/JP2004/014662.

(Continued)

*Primary Examiner*—Melody Mehrpour
(74) *Attorney, Agent, or Firm*—Eric J. Robinson; Robinson Intellectual Property Law Office, P.C.

(57) ABSTRACT

An effective random access control can be performed with a high throughput. A base station (11) communicates with mobile stations (12) by use of slotted ALOHA system. An offset time of 1.5 frames is established between upstream and downstream communication frames. If any of the upstream communication frames is available, the base station (11) notifies a transmission permission signal (I) by use of the corresponding downstream frame. If having data to be transmitted, a mobile station (12) in a reception state receives the transmission permission signal (I), switches itself into a transmission state, and transmits one frame of leading data by use of the upstream frame. If permitting continuous transmission of data following the leading data, the base station (11) transmits a continuous transmission permission information (P) to that mobile station (12), and transmits a transmission inhibition signal (B) to the other mobile stations (12) during that continuous transmission. When receiving the continuous transmission permission information (P), that mobile station (12) places itself in a transmission mode, and transmits the following data by use of a plurality of continuous frames of the upstream communication frames.

7 Claims, 12 Drawing Sheets

U.S. PATENT DOCUMENTS

2005/0242927 A1　11/2005　Friedrich
2007/0071114 A1　 3/2007　Sanderford et al.

FOREIGN PATENT DOCUMENTS

| EP | 0 951 154 | 10/1999 |
| EP | 1 098 542 | 5/2001 |
| JP | 09-116954 | 5/1997 |
| JP | 10-056417 | 2/1998 |
| JP | 2000-307586 | 11/2000 |
| JP | 2000-341292 | 12/2000 |
| JP | 2001-285928 | 10/2001 |

OTHER PUBLICATIONS

International Preliminary Examination Report for PCT/JP2004/014662 dated Jun. 29, 2006.
European Search Report (Application No. 09005330.7) dated Aug. 17, 2009.

US 7,738,430 B2

MOBILE COMMUNICATION SYSTEM, MOBILE COMMUNICATION METHOD, BASE STATION, AND MOBILE STATION

TECHNICAL FIELD

The present invention relates to a mobile communication system, a mobile communication method, a base station and a mobile station for execution of random access control.

BACKGROUND ART

Various methods of slotted-ALOHA random access control on mobile units have been studied. For example, in a TDMA (time division multiple access) method, Idle-Single Casting Multiple Access with Partial Echo (ICMA-PE) in accordance with a digital car phone system standard (ARIB STD-27) or the like is being used. ICMA-PE itself is described in detail in Non-Patent Document 1.

Under random access control in TDMA such as PDC (Personal Digital Cellular) in Japan, a mobile station alternately performs transmission and reception according to the characteristics of TDMA. After data transmission by the mobile station, a base station can enable a condition as to whether or not transmission has been correctly performed by the mobile station to be reflected in reception subsequently performed by the base station, because a sufficient time period for doing so exists before the time at which reception is to be subsequently performed by the mobile station. Therefore no time slot loss occurs with respect to time. Also, the mobile station can perform transmission by full-duplex and therefore can be informed of the results of transmission to the base station by the next reception.

The base station may be configured so that if the size of data transmitted from the mobile station is so large that the time required for transmission extends over a plurality of slots, it determines the number of remaining slots from information contained in data in the leading slot, inhibits transmission by any other mobile station until the number of remaining slots becomes zero, and thereby makes a "reservation" to permit the mobile station that has transmitted the leading slot to perform transmission with priority.

In slotted-ALOHA random access control in an FDMA (frequency division multiple access) method, transmitted and received frames appear continuously with respect to time. A new concept is therefore required for notification (transmission), before a time for the next reception by a mobile station, of information as to whether or not a base station has correctly received data transmitted by the mobile station.

In systems under a strong demand for a reduction in price, e.g., wireless communication systems for business purposes, mobile stations are ordinary configured for half-duplex. A half-duplex-type mobile station cannot perform transmission during transmission and immediately after the completion of transmission due to switching operation between transmission and reception. Therefore, when a base station notifies such a mobile station about whether or not the base station has correctly received data in the leading frame that the mobile station has transmitted, it must transmit data indicating the reception result after a lapse of a certain time period from transmission of the leading frame by the mobile station.

Random access in FDMA is described in a narrow-band digital communication standard (ARIB STD-T61) for example. Also, a control method using the concept of reservation is described in Patent Document 1.

An example of operations in accordance with ARIB STD-T61 will first be described.

In ARIB STD-T61, a downstream frame from a base station to a mobile station contains information for collision control. This collision control information has the following contents:

1) I/B information indicating whether or not the next upstream time is available (with respect to the same frame number);

2) R/N information indicating whether or not an upstream signal having the third preceding frame number has been received; and 3) PE information indicating a partial echo of the upstream signal having the third preceding frame number.

In ARIB STD-T61, a mobile station can transmit three preceding frames without reception confirmation.

FIG. 11 shows an example of operations in a case where mobile stations MA and MB each transmit four consecutive frames at times generally coinciding with each other to cause collision therebetween. It is assumed that in this operation example the radio wave environment for the mobile station MA is better and information transmitted from the mobile station MB does not reach a base station. The operation in FIG. 11 will be described below.

When the mobile station MA receives the first downstream frame #1 from the base station, it determines that I/B (transmission permission/inhibition information) is I (permission) and starts transmission. An information length of 4 frames is recorded in data transmitted by the mobile station MA. On the other hand, when the mobile station MB receives the second downstream frame #2 from the base station, it determines that I/B therein is I and starts transmission. An information length of 4 frames is also recorded in transmitted data.

The base station receives the data transmitted from the mobile station MA and changes I/B to B in the fourth frame #4 since the transmitted data is consecutive data (having an information length larger than 1 and contained in a plurality of frames).

When the mobile station MA receives the fourth frame #4, it determines that R/N is R and that a CRC sent in the leading frame from itself and the received PE coincide with each other. It then determines that consecutive transmission can be continued, transmits the final frame #4, and stops transmitting since all the data has been transmitted.

On the other hand, the mobile station MB performs transmission without confirmation until it completes transmission of the third frame #3. However, the transmitted data does not reach the base station because of collision with transmission by the mobile station MA. When the mobile station MB receives a downstream frame (the fifth frame #5 in the example) after the completion of transmission of the third frame #3, it determines that the PE in the downstream frame does not coincide with the CRC sent in the leading frame from itself. At this point in time, the mobile station MB determines that the data transmitted from itself has not reached the base station, i.e., transmission failure, and tries to retransmit after random delay without transmitting the fourth frame.

A random access control method disclosed in Japanese Patent Application Laid-Open No. 2001-285928 will next be described with reference to FIG. 12.

In this random access control method, information for collision control is set together with other data in a downstream frame from a base station to a mobile station. The collision control information has the following contents:

1) I/B information designating permission/inhibition of transmission by a mobile station at an upstream time (with respect to the same frame number);

2) R/N information indicating whether or not an upstream signal having the third preceding frame number has been received; and 3) Mobile station information indicating from which mobile station the upstream signal having the third preceding frame number has been received.

According to an embodiment described in Japanese Patent Application Laid-Open No. 2001-285928, a mobile station is provided with I/B information in three-bit form. Details of this I/B information are as described below.

000: Transmission inhibition 1 ("Inhibition 1" in FIG. 8 of this publication) . . . . There is only one remaining upstream transmission frame signal from a mobile station given a transmission right.

001: Transmission inhibition 2 ("Inhibition 2" in FIG. 8) . . . . The final upstream transmission frame has been received or an error has occurred in reception of the upstream transmission frame signal.

010: Transmission inhibition 3 ("Inhibition 3" in FIG. 8). An upstream transmission frame including a transmission request has been received from a mobile station.

100: Transmission right giving ("Giving" in FIG. 8) . . . . Giving a transmission right to a mobile station which has transmitted an upstream transmission frame signal of a transmission request without collision or error 101: Designated mobile station transmission permission ("Permission" in FIG. 8) . . . . A state in which a particular mobile station is given a transmission right.

111: Available ("Available" in FIG. 8) . . . . A state in which transmission of an upstream transmission frame signal from any mobile station is accepted.

FIG. 12 shows an example of transmission and reception of upstream and downstream frames in a case where mobile stations MA and MB each transmit four consecutive frames.

Operations for this transmission and reception will be described below by way of example with reference to FIG. 12.

When the mobile station MA receives a downstream frame (assumed to be first downstream frame #1) from a base station, it determines that I/B is "Available" and starts transmission. An information length of 4 frames is recorded in transmitted data.

The base station detects the signal by a time T1 at which the mobile station MA starts transmission, and makes I/B "Transmission inhibition 3" although reception of the leading frame is not completed. After receiving the entire leading transmission frame from the mobile station MA, the base station determines whether or not the data transmitted from the mobile station MA is consecutive data. In this example, since the information length is larger than 1 and since the transmitted data is consecutive data, the base station gives a transmission right to the mobile station MA at a time T2 and makes I/B "Transmission right giving" and makes the mobile station information designative of the mobile station MA. When the mobile station MA receives the third frame #3 including these items of information from the base station, it determines that transmission can be continued and transmits all the remaining frames. The mobile station MA thereafter stops transmitting since all the transmission frames have been transmitted.

On the other hand, at about the time for the second downstream frame #2, the mobile station MB has data to be transmitted. However, the mobile station MB performs a waiting operation since I/B in the downstream frame is "Transmission inhibition 3". At a time T3 after the completion of transmission by the mobile station MA, the mobile station MB determines that I/B has become "Available" and starts transmission.

Non-Patent Document 1: Transactions of The Institute of Electronics, Information and Communication Engineers, vol. J76-B-II, No. 3, pp. 157-165 "Idle-signal casting multiple access with partial echo (ICMA-PE)"

Patent Document 1: Japanese Patent Application Laid-Open No. 2001-285928

The conventional slotted-ALOHA random access control is designed with a TDMA method in mind. However, it is difficult to perform the conventional slotted-ALOHA random access control as control for processing in a base station the contents of data transmitted from a mobile station and enabling reflection of a processing result in the next transmission from the mobile station because transmission and reception are continuously performed with respect to time in FDMA.

In a system in accordance with ARIB STD-T61, a mobile station can transmit three frames without reception confirmation by a base station. In this system, therefore, a mobile station can start transmission before another mobile station performing transmission completes transmission of leading three frame, so that collision occurs frequently between upstream frames.

In many cases of actual random access transmission from mobile stations, the number of frames is three or less. In transmission of three frames or less, I/B of the downstream frames from a base station is not changed from I. As a matter of fact, the chances of control by idle-signal casting are limited.

Random access control disclosed in patent document 1 has some effect in solving these problems. In random access control disclosed in patent document 1, no collision occurs between a particular mobile station and other mobile stations when the particular mobile station is continuously performing transmission with a transmission right given by a base station, but each and every mobile station is kept in a transmission inhibited state before given a transmission right. This control method therefore has a problem that the throughput is low. Also, this control method requires detecting a transmitted signal when a mobile station starts transmitting a leading frame, immediately providing collision control information reflecting a result of this detection, and immediately providing collision control information reflecting the completion of reception of one transmission frame by a base station after the completion of transmission of this transmission frame.

Thus, the load on a base station is large and there are difficulties in providing a base station configuration and control.

In the control method in accordance with ARIB STD-T61 and the control method disclosed in patent document 1, it is necessary for a mobile station to perform transmission/reception control in a full-duplex method. However, mobile stations such as wireless communication devices for business purposes under a strong demand for a reduction in price are ordinary configured for half-duplex. It is necessary to perform timing control in such half-duplex mobile stations by considering a transmission-reception switching time. Therefore the above-described control methods cannot be applied to such mobile stations.

Thus, the efficiency of the conventional random access control is low. There is a demand for random access control of higher efficiency.

The present invention has been achieved in consideration of the above-described problems of the conventional art, and an object of the present invention is to make possible random access control of high efficiency and high throughput.

Another object of the present invention is to make possible random access control with a reduced control load.

Still another object of the present invention is to make possible random access control applicable to a mobile station of a half-duplex configuration.

SUMMARY OF THE INVENTION

To achieve the above-described objects, according to a first aspect of the present invention, there is provided a mobile communication system in which a base station (11) and mobile stations (12) perform communication by a slotted-ALOHA method, the system being characterized in that a predetermined offset time is set between downstream communication frames from the base station to each mobile station and upstream communication frames from the mobile station to the base station;

the base station transmits a transmission permission signal (I) for permitting transmission of one frame of data when a particular one of the upstream communication frames is available, determines whether or not continuous transmission of subsequent data over a plurality of frames should be permitted if the subsequent data exists subsequently to the one frame of data received through the particular frame from one of the mobile stations, and transmits a continuous transmission permission signal (P) for permission of the continuous transmission when the continuous transmission is permitted; and if each mobile station has data to be transmitted, it transmits one frame of data in response to the transmission permission signal (I) from the base station, and transmits the subsequent data through a plurality of consecutive frames in the upstream communication frames when receiving the continuous transmission permission signal (P) with respect to the transmitted one frame of data.

For example, the upstream communication frames from the mobile station to the base station are delayed from the downstream communication frames from the base station to the mobile station by a time period longer than one frame and shorter than two frames; the base station (11) transmits the transmission permission signal (I) through the frame in the downstream communication frames corresponding to the first frame in the upstream communication frames if the first frame in the upstream communication frames is available; if the mobile station (12) has data to be transmitted, it transmits the one frame of data through the first frame in the upstream communication frames when receiving the transmission permission signal through the frame corresponding to the first frame; determination is made as to whether or not continuous transmission of subsequent data over a plurality of frames should be permitted if the subsequent data exists subsequently to the one frame of data received through the particular frame from the mobile station, and the continuous transmission permission signal (P) is transmitted through the second frame three frames after the frame corresponding to the first frame when the continuous transmission is permitted; and when the mobile station receives the continuous transmission permission signal (P) through the second frame in the downstream communication frames, it transmits the subsequent data through a plurality of consecutive frames in the upstream communication frames the leading one of which corresponds to the second frame.

For example, when the mobile station (12) receives the continuous transmission permission signal (P), it transmits the subsequent data through the consecutive frames without checking whether or not the base station has succeeded in reception.

For example, the mobile station has a half-duplex-type configuration capable of selectively executing transmission processing and reception processing; and, when the mobile station receives the transmission permission signal in a receiving mode, and if data to be transmitted exists, it transmits the one frame of data in the upstream communication frame by selecting a transmitting mode in place of the receiving mode, thereafter receives the downstream communication frame by selecting the receiving mode, and, when receiving the continuous transmission permission signal, continuously transmits the subsequent data through the plurality of frames in the upstream communication frames by selecting the transmitting mode.

For example, the base station transmits, together with the continuous transmission permission signal (P), information (R/N, CRC) as to whether or not one frame of data has been normally received from the mobile station; and the mobile station determines whether or not the base station has normally received the one frame of data transmitted from the mobile station, and transmits the subsequent data if it determines that the base station normally receives the data.

For example, the base station transmits mobile station identification information for identification of one of the mobile stations together with the continuous transmission permission signal (P); and the mobile station transmits the subsequent data when the mobile station identification information designates the mobile station.

For example, the mobile station (12) transmits information for identification of the number of frames of the subsequent data together with the one frame of data; the base station (11) transmits a transmission inhibition signal (B) for inhibiting data transmission from the other mobile stations during transmission of the subsequent data by the mobile station on the basis of the number of frames of the subsequent data notified from the mobile station; and the mobile station that has transmitted the one frame of data in the mobile stations continuously transmits the subsequent data according to the continuous transmission permission signal, the other mobile stations restraining themselves in response to the transmission inhibition signal from performing data transmission during transmission of the subsequent data.

For example, the base station transmits a continuous transmission non-permission signal (D) when it does not permit continuous transmission of data subsequent to the one frame of data; and each mobile station determines whether or not the base station has received the one frame of data transmitted from the mobile station, keeps on standby for transmission of the subsequent data after a lapse of a predetermined frame period if it determines that the base station has received the data, and if it has received the continuous transmission non-permission signal (D), and transmits the leading one frame of data in the subsequent data if it receives the transmission permission signal (I) during standby.

For example, if the mobile station (12) cannot receive the transmission permission signal (I) during a predetermined time period in a case where it has data to be transmitted, it recognizes transmission failure, sets a delay time, and again executes processing for awaiting reception of the transmission permission signal after a lapse of time through the delay time.

For example, the base station includes means of determining whether or not the continuous transmission should be permitted on the basis of a condition of traffic.

To achieve the above-described objects, according to a second aspect of the present invention, there is provided a base station for use in a mobile communication system in which communication is performed by a slotted-ALOHA method, the base station being characterized in that a predetermined offset time is set between downstream communication frames from the base station to a mobile station and upstream communication frames from the mobile station to the base station, the base station having:

transmission permission signal transmitting means of transmitting, through a predetermined frame in the downstream communication frames, a transmission permission signal (I) for permitting transmission of one frame of data when one of the upstream communication frames is available;

receiving means of receiving one frame of data transmitted from the mobile station through one of the upstream communication frames corresponding to the predetermined frame; and continuous transmission permission signal transmitting means of determining whether or not continuous transmission of subsequent two or more frames of data should be permitted if the subsequent frames of data exists subsequently to the received one frame of data, and transmitting through the downstream communication frame a continuous transmission permission information (P) for permission of the continuous transmission when the continuous transmission is permitted.

To achieve the above-described objects, according to a third aspect of the present invention, there is provided a mobile station for use in a mobile communication system in which communication is performed by a slotted-ALOHA method, the mobile station being characterized in that a predetermined offset time is set between downstream communication frames from a base station to the mobile station and upstream communication frames from the mobile station to the base station, the mobile station having:

transmission permission signal receiving means of receiving a transmission permission signal (I) from the base station;

leading data transmitting means of transmitting one frame of leading data through one of the upstream communication frames in response to the transmission permission signal if the data to be transmitted exists;

continuous transmission permission signal receiving means of receiving one of the downstream communication frames subsequently to transmission of the leading data to receive a continuous transmission permission signal; and continuous transmission means of continuously transmitting subsequent data subsequent to the leading data through a plurality of frames in the upstream communication frames in response to the continuous transmission permission signal.

To achieve the above-described objects, according to a fourth aspect of the present invention, there is provided a mobile communication method in which a first and second communication devices perform communication by a slotted-ALOHA method, the method being characterized in that a predetermined offset time is set between first communication frames from the first communication device to the second communication device and second communication frames from the second communication device to the first communication device, and a transmission permission signal (I) for permitting transmission of one frame of data when a particular one of the second communication frames is available is transmitted from the first communication device to the second communication device;

one frame of data in three or more frames of data to be transmitted is transmitted from the second communication device to the first communication device in response to the transmission permission signal (I);

determination is made on the basis of the one frame of data as to whether or not continuous transmission of data subsequent to the one frame of data over a plurality of frames should be permitted;

a continuous transmission permission information (P) for permitting the continuous transmission is transmitted from the first communication device to the second communication device when the continuous transmission is permitted; and the subsequent data is transmitted through a plurality of consecutive frames in the second communication frames in response to the continuous transmission permission signal (P).

To achieve the above-described objects, according to a fifth aspect of the present invention, there is provided a medium on which a computer program is recorded, the computer program enabling a computer having a communication function to function as a base station for use in a mobile communication system in which an offset time is set between downstream communication frames from the base station to a mobile station and upstream communication frames from the mobile station to the base station, and in which communication is performed by a slotted-ALOHA method, the base station having:

transmission permission signal transmitting means of transmitting, through a predetermined frame in the downstream communication frames, a transmission permission signal (I) for permitting transmission of one frame of data when one of the upstream communication frames is available;

receiving means of receiving one frame of data transmitted from the mobile station through one of the upstream communication frames corresponding to the predetermined frame; and continuous transmission permission signal transmitting means of determining whether or not continuous transmission of subsequent two or more frames of data should be permitted if the subsequent frames of data exists subsequently to the received one frame of data, and transmitting through the downstream communication frame a continuous transmission permission information (P) for permission of the continuous transmission when the continuous transmission is permitted.

To achieve the above-described objects, according to a sixth aspect of the present invention, there is provided a medium on which a computer program is recorded, the computer program enabling a computer having a communication function to function as a mobile station for use in a mobile communication system in which an offset time is set between downstream communication frames from a base station to the mobile station and upstream communication frames from the mobile station to the base station, and in which communication is performed by a slotted-ALOHA method, the mobile station having:

transmission permission signal receiving means of receiving a transmission permission signal (I) from the base station;

leading data transmitting means of transmitting one frame of leading data through one of the upstream communication frames in response to the transmission permission signal if the data to be transmitted exists;

continuous transmission permission signal receiving means of receiving one of the downstream communication frames subsequently to transmission of the leading data to receive a continuous transmission permission signal; and continuous transmission means of continuously transmitting subsequent data subsequent to the leading data through a plurality of frames in the upstream communication frames in response to the continuous transmission permission signal.

ADVANTAGES OF THE INVENTION

According to the present invention, random access control of high efficiency and high throughput can be achieved.

According to the present invention, random access control with a reduced control load can also be achieved.

The present invention can also be applied to a mobile station of a half-duplex configuration.

DETAILED DESCRIPTION OF INVENTION

Random access control according to an embodiment of the present invention will be described with reference to the drawings with respect to an example of a mobile wireless communication system to which this random access control is applied.

Figure 1:
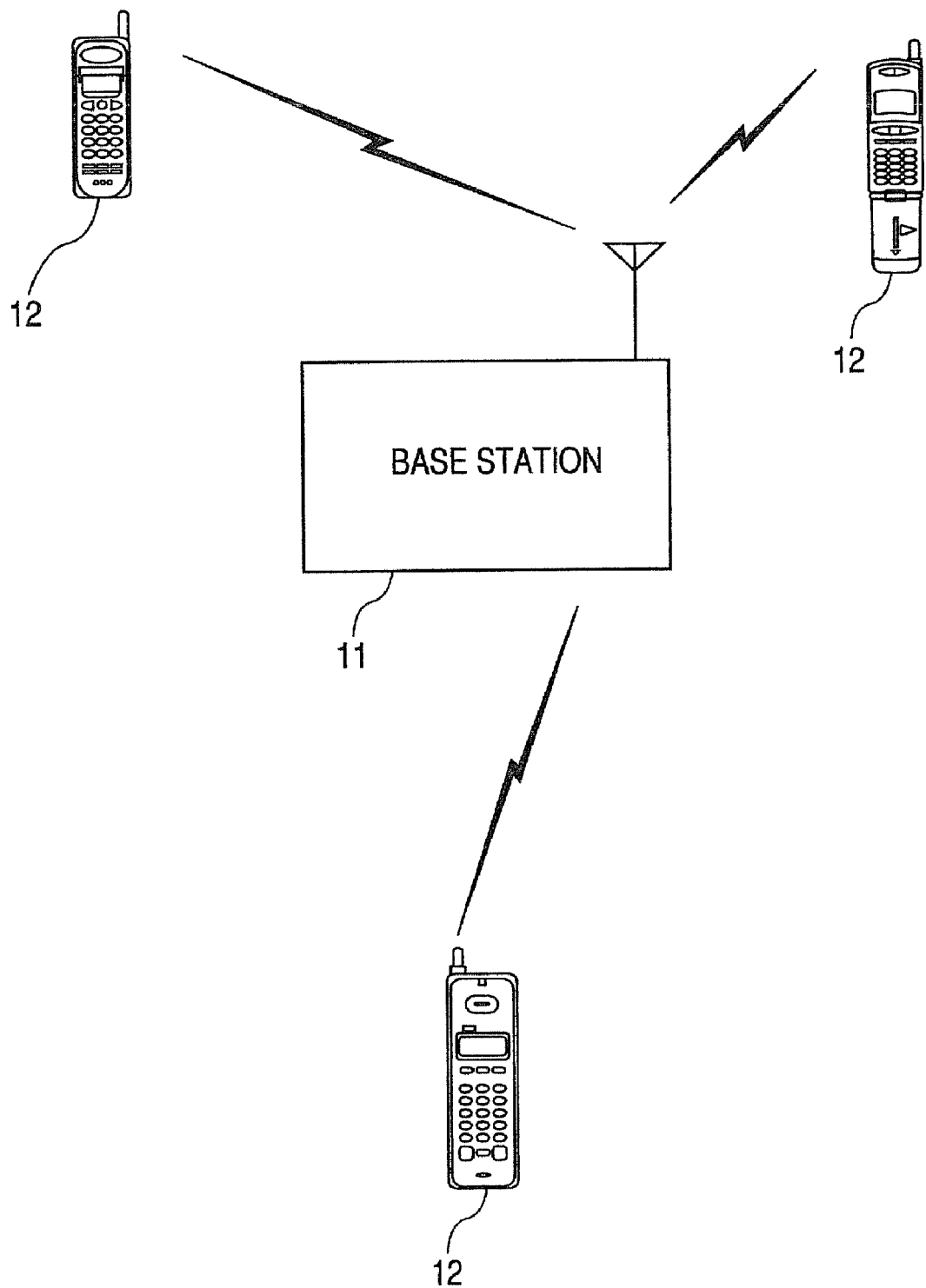
FIG. 1 is a diagram showing a configuration of a mobile communication system according to an embodiment of the present invention.

The mobile wireless communication system to which random access control according to this embodiment is applied is constituted by, as shown in FIG. 1, a base station 11 and a plurality of mobile stations 12 existing in a communication area around the base station 11.

The base station 11 is connected to other base stations 11 through a network. The base station 11 and each mobile station 12 perform various control operations relating to ordinary portable telephone communication. However, the following description is made mainly of portions relating to random access control.

Figure 2:
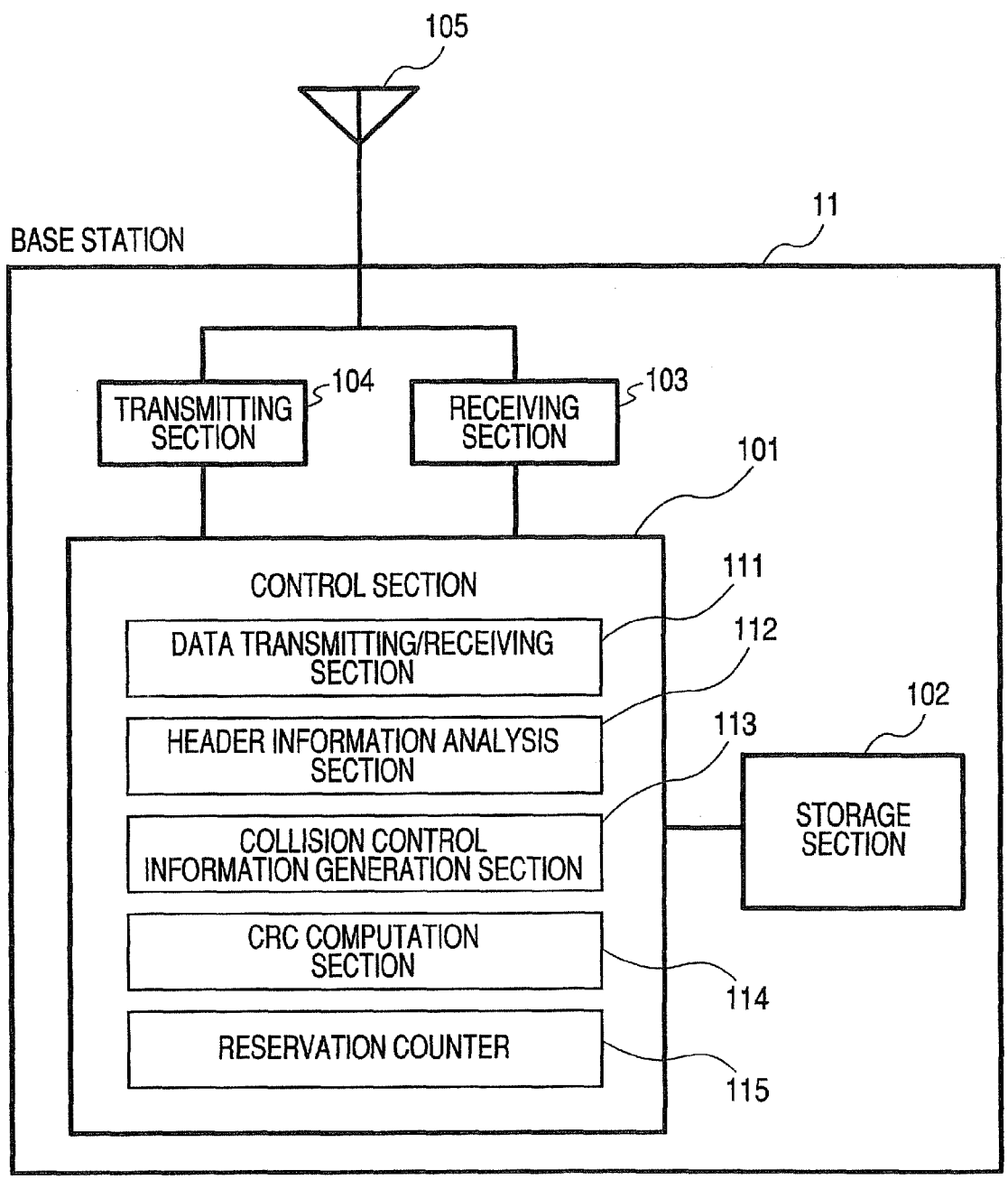
FIG. 2 is a block diagram showing an example of a configuration of a base station shown in FIG. 1.

The base station 11 is an apparatus supporting a full-duplex communication method in an FDM (frequency division multiplexing) method. As shown in FIG. 2, the base station 11 has a control section 101, a storage section 102, a receiving section 102, a transmitting section 104 and an antenna 105.

The control section 101 is constituted by a CPU (central processing unit) and other components. The control section 101 performs communication control by executing an operation program stored in the storage section 102.

The control section 101 has, as components relating to random access, a data transmitting/receiving section 111, a header information analysis section 112, a collision control information generation section 113, a CRC (cyclic redundancy check) computation section 114 and a reservation counter 115.

The data transmitting/receiving section 111 controls data transmission/reception between the base station and the mobile stations 12.

The header information analysis section 112 analyzes header information set in a received frame (data transmitted on a frame-by-frame basis from mobile station 12) and determines whether or not the frame is a leading frame and the total number of frames to be transmitted (data length) for example.

The collision control information generation section 113 generates collision control information to be transmitted to all the mobile stations 12 in the communication area to control the mobile stations 12 so that the mobile stations 12 do not simultaneously transmit data continuously. The collision control information will be described in detail.

The CRC computation section 114 performs processing for checking a CRC code in received data for example.

The reservation counter 115 is a counter for counting the number of received frames of remaining data when a plurality of frames of data are successively received from a particular one of the mobile stations 12.

The storage section 102 stores the operation program, fixed data and the like for the control section 101.

The receiving section 103 receives data from each mobile station 12 through the antenna 105, performs demodulation for restoring the data, for example, by converting the data into a base band signal, and provides the data to the control section 101.

The transmitting section 104 receives from the control section 101 data (base band signal) to be transmitted to the mobile stations 12, modulates a signal to be transmitted with this data, amplifies the signal and transmits the signal through the antenna 105.

Figure 3:
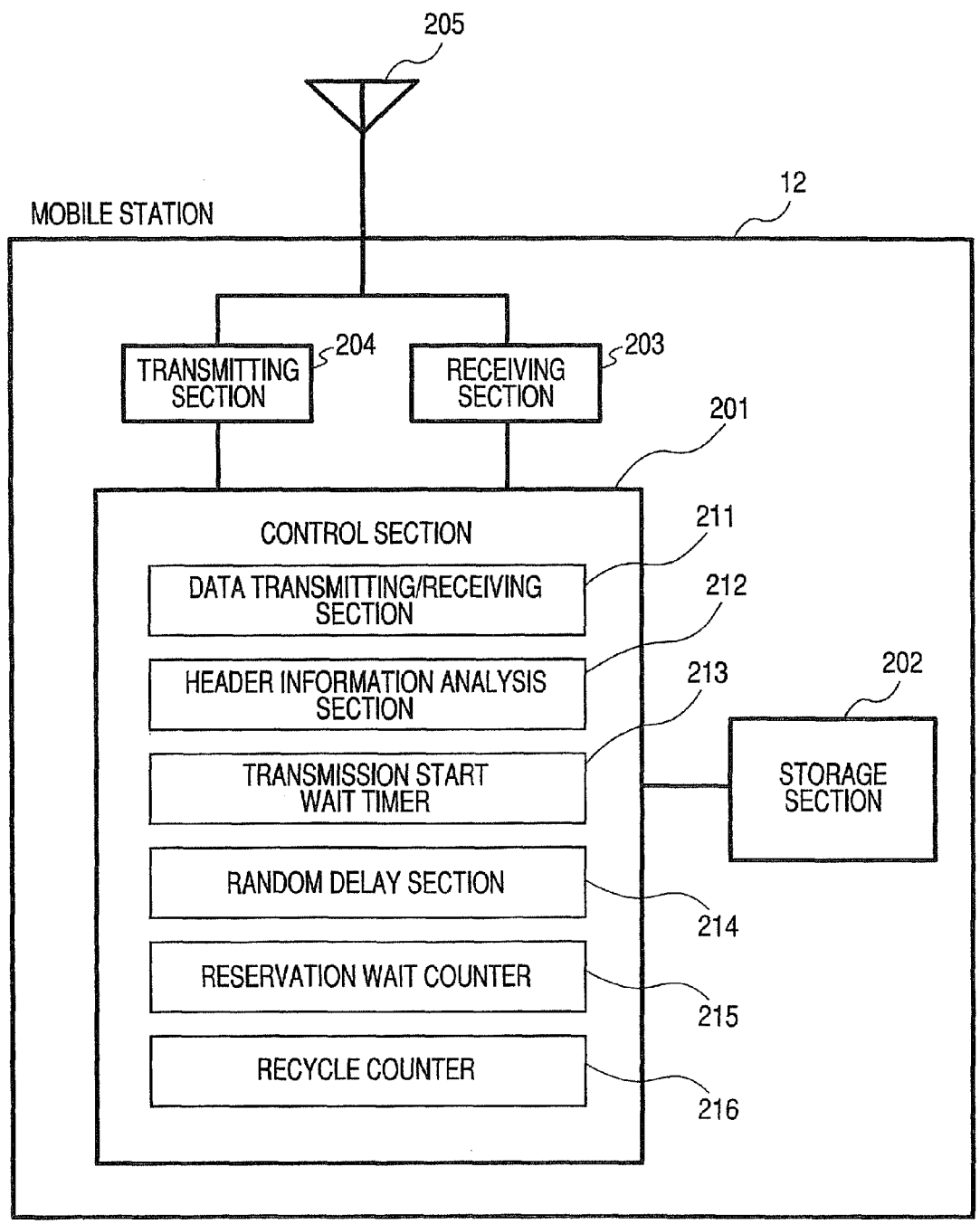
FIG. 3 is a block diagram showing an example of a configuration of a mobile station shown in FIG. 1.

Each mobile station 12 is a device supporting a full-duplex communication method in an FDMA (frequency division multiplex access) method. As shown in FIG. 3, each mobile station 12 has a control section 201, a storage section 202, a receiving section 203, a transmitting section 204 and an antenna 205.

The control section 201 is constituted by a CPU (central processing unit), a DSP (digital signal processor) and other components. The control section 201 performs communication control by executing an operation program stored in the storage section 202.

The control section 201 has, as components relating to random access, a data transmitting/receiving section 211, a header information analysis section 212, a transmission start wait timer 213, a random delay section 214, a reservation wait counter 215 and a recycle counter 216.

The data transmitting/receiving section 211 controls data transmission/reception between the mobile station and the base station 11.

The header information analysis section 212 analyzes header information set in a received frame (data transmitted on a frame-by-frame basis from base station 11) and obtains, for example, collision control information contained in the header information.

The transmission start wait timer 23 counts time elapsed after start of trying data transmission by the control section 201.

The random delay section 214 has a random number generation function for determining a random delay time and a timer for measuring the time (delay time) corresponding to a generated random number. When an event occurs in which after transmission of a leading frame by the mobile station 12 the base station 11 cannot suitably receive this frame, the random delay section 214 determines a time to retransmit the leading frame.

The reservation wait counter 215 counts, in a case where data to be transmitted is a plurality of frames, the number of frames until a "reservation" for continuous transmission of remaining data is made after transmitting the leading frame and after the base station 11 has suitably received the leading frame.

The recycle counter 216 counts the number of successive occurrences of an event in which after transmission of a leading frame by the mobile station 12 the base station 11 cannot suitably receive the frame.

The storage section 202 stores the operation program, fixed data and the like for the control section 201.

The receiving section 203 receives data from the base station 11 through the antenna 205, performs demodulation for restoring the data, for example, by converting the data into a base band signal, and provides the data to the control section 201.

The transmitting section 204 receives from the control section 201 data (base band signal) to be transmitted to the base stations 11, modulates a signal to be transmitted with this data, amplifies the signal and transmits the signal through the antenna 205.

Figure 4:
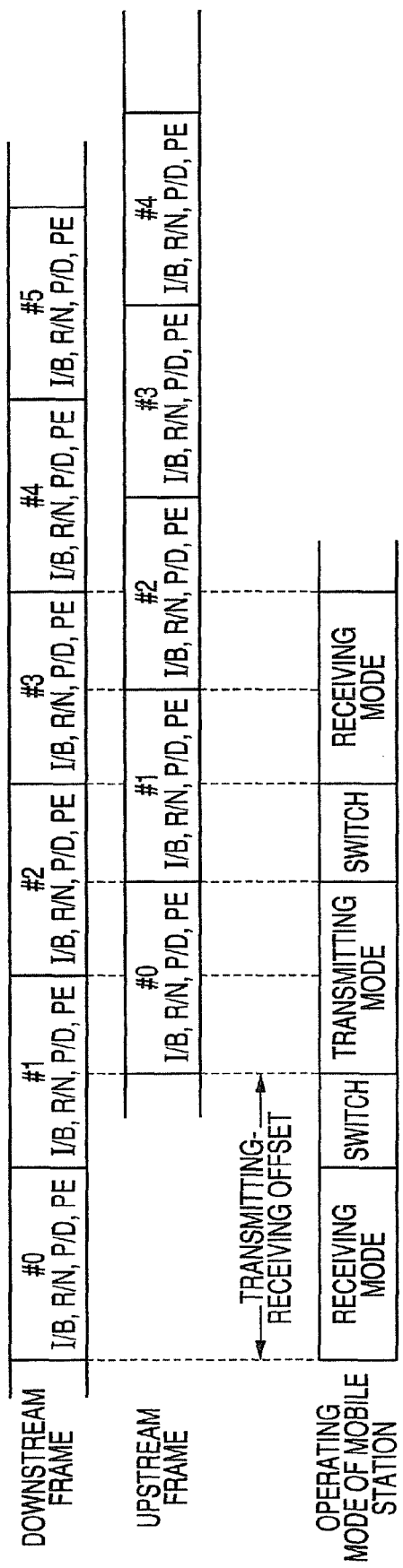
FIG. 4 is a diagram showing the constructions of upstream and downstream frames formed by the mobile communication system shown in FIG. 1.

The random access method executed between the thus-arranged base station 11 and mobile stations 12 is assumed to be a slotted-ALOHA method based on the ICMA-PE method in an FDM/FDMA system taking a frame construction such as shown in FIG. 4.

That is, a transmitting-receiving offset time corresponding generally to a 1.5-frame period is provided between a downstream signal (downstream frame) and an upstream signal (upstream frame), and frame numbers are respectively assigned to the frames.

The mobile station 12 is of a half-duplex communication type incapable of performing reception when performing transmission, and incapable of performing transmission when performing reception. Therefore the mobile station 12 performs (sets) a receiving operation (receiving mode) and a transmitting operation (transmitting mode) at different times, between which a switching time is inserted, and is switch-controlled so that the period for the receiving operation includes some of the frame periods for downstream frames, and the transmitting mode period includes some of the frame periods for upstream frames.

A signal transmitted from the base station 11 to the mobile station 12 (downstream frame) includes information for collision control as well as other data items. The collision control information has the following contents:

1) I/B information indicating whether or not an upstream time is available (with respect to the same frame number);

2) R/N information indicating whether or not an upstream signal having the third preceding frame number has been received;

3) P/D information indicating whether or not continuous transmission from the next upstream time (with respect to the same frame number) is permitted; and 4) PE information indicating a partial echo of the upstream signal having the third preceding frame number.

Operations in a case where data transmission/reception is performed between the mobile stations 12 and the base station 11 by using such a frame construction will now be described.

The operation of the base station 11 will be described with reference to the flowchart of FIG. 5.

Figure 5:
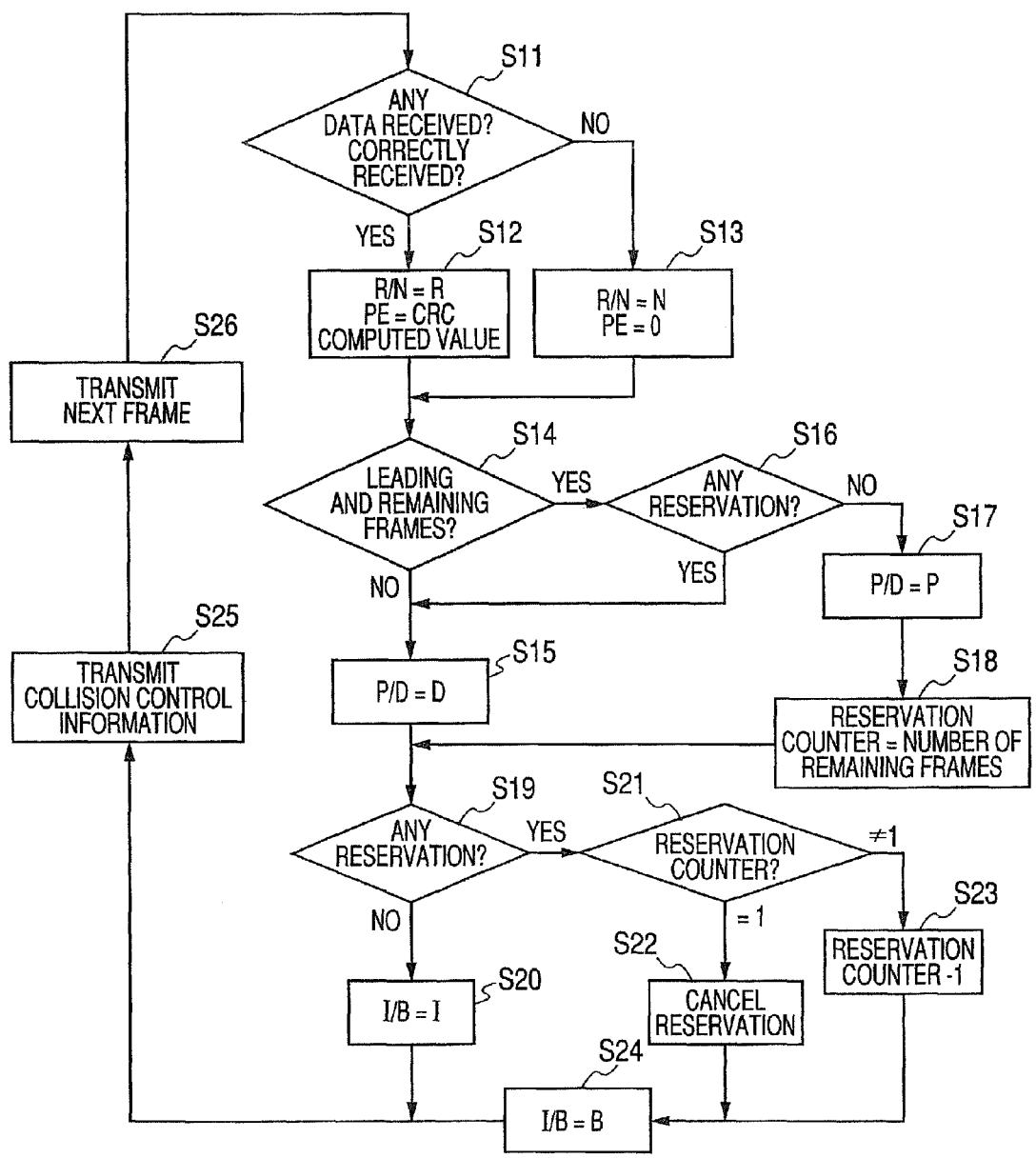
FIG. 5 is a flowchart for explaining the basic operation of the base station.

The base station 11 repeatedly executes processing shown in FIG. 5.

In the base station 11, the receiving section 102 receives data transmitted from one of the mobile stations 12 through the antenna 105, restores the data by demodulation, and supplies the data to the control section 101. The control section 101 CRC checks in the CRC computation section 114 to determine whether or not the received data has been correctly received (step S11).

If any data has been received and if the data has been correctly received (step S11; Yes), the control section 101 sets R/N in data to be transmitted in the next downstream frame (the (n+3)th frame if the received data is the nth frame) to R indicating that the data has been received, and sets PE in the data to the CRC computed value of the received data (step S12).

If the control section 101 determines in step S11 that no data has been received or data has not been correctly received (step S11; No), it sets RN in the data to be transmitted in the next downstream frame to N indicating that no data has been received, and sets PE in the data to "0" (step S13).

Subsequently to step S12 or S13, the control section 101 determines, by means of the header information analysis section 112, from header information in the received data, whether or not the received frame is a leading frame and whether or not there is any remaining frame (step S14).

If the control section 101 determines that the received data is not a leading frame or that there is no remaining frame (step S14; No), it sets P/D in the data to be transmitted in the next downstream frame to D for non-permission of successive reception (continuous transmission non-permission signal) (step S15).

If the control section 101 determines in step S14 that the received data is a leading frame and there is one or more remaining frames (step S14; Yes), it determines, from the value of the reservation counter 115 indicating the number of remaining frames, whether or not a reservation has been set for data transmission by one of the mobile stations using the next upstream frame (step S16). If there is a reservation (step S16; Yes), the control section 101 advances the process to the above-mentioned step S15 for reception of the reserved transmission. If there is no reservation (step S16; No), the control section 101 sets P/D in the data to be transmitted in the next downstream frame to P for permission of continuous transmission (step S17) and sets the number of remaining frames (the total number of transmission frames obtained by the header information analysis section 112-1) in the reservation counter 115 (step S18).

Subsequently to step S16 or S18, the control section 101 again determines whether or not there is a reservation for continuous transmission (step S19). If the control section determines that there is no reservation (step S19; No), it sets I/B to be transmitted in the next downstream frame to I (the next frame is available) (step S20). If the control section 101 determines that there is a reservation (step S19; Yes), it checks the value of the reservation counter 115 (step S21). If the value of the reservation counter 115 is "1", the control section 101 cancels the reservation (by setting the count value of the reservation counter 115 to 0) since the reserved data transmission is completed by upstream transmission in the next frame (step S22). If the value of the reservation counter 115 is not "1", the control section 101 decrements the count value of the reservation counter 115 by 1 (step S23).

After processing in step S22 or S23, the control section 101 sets I/B to be transmitted in the next downstream frame to B (transmission inhibition) (step S24).

After the beginning of the next frame period, the control section 101 transmits through the transmitting section 104 the collision control information including R/N and PE set in step S12 or 13 and I/B set in step S15 or S24 (step S25) and further transmits the data portion in the next frame (step S26).

The control section 101 repeatedly executes the above-described operation.

Figure 6:
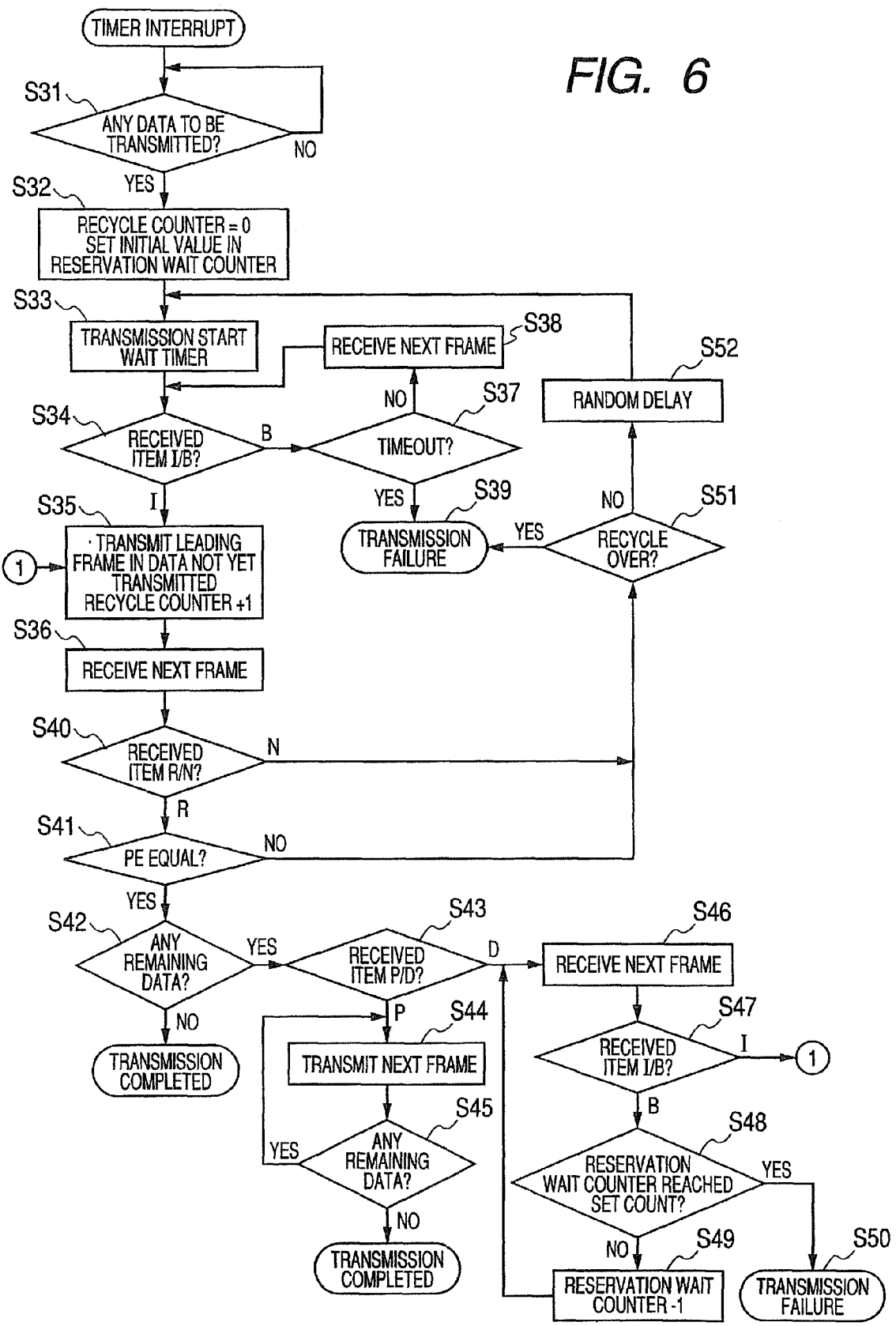
FIG. 6 is a flowchart for explaining the basic operation of the mobile station.

On the other hand, the control section 201 in the mobile station 12 starts random access control processing shown in FIG. 6, for example, in response to a timer interrupt or the like during the period when the operating mode is the receiving mode.

The control section 201 first determines whether or not there is any data to be transmitted (step S31). Data to be transmitted is stored in advance in the storage section 202 by being divided into packets, each of which is a unit to be transmitted in one frame. Each packet includes header information and a payload. The payload includes actual data to be transmitted and CRC information.

If the control section 201 determines that there is data to be transmitted (step S31; Yes), it sets 0 in the recycle counter 216 and sets a predetermined value in the reservation wait counter 215 (step S32). Subsequently, the control section 201 activates the transmission start wait timer 213 and makes this timer start measuring a lapse of time (step S33).

Subsequently, the control section 201 determines whether I/B in collision control information received in the immediately preceding downstream frame is I (available) or B (transmission non-permission) by means of the header information analysis section 212 (step S34).

If the control section 201 determines that I/B=I, that is, the next upstream frame is available (empty frame), it makes the data transmitting/receiving section 211 transmit through the transmitting section 204 the packet data corresponding to the first one frame in the data not yet transmitted in the data to be transmitted (step S35). Further, the control section 201 increments the recycle counter 216 by 1 (step S35).

Subsequently, the control section 201 changes the transmitting/receiving mode to the receiving mode, awaits reception of the next downstream frame and receives the next downstream frame (step S36).

If the control section 201 determines that I/B=B in step S34, it determines whether or not the count value of the transmission start wait timer 213 activated in step S33 has reached a set value, that is, a predetermined time period has elapsed (step S37). If the predetermined time period has not elapsed (step S37; No), the control section 201 changes the transmitting/receiving mode to the receiving mode, awaits reception of the next downstream frame, receives the next downstream frame (step S38), and returns to step S34.

If the control section 201 determines in step S37 that the predetermined time period has elapsed (step S37; Yes), it recognizes transmission failure and executes suitable processing (step S39).

When the control section 201 receives the next downstream frame through the receiving section 203 in step S36, it determines whether R/N in the received collision control information is R (the base station 11 has received data) or N (the base station 11 has not received data) by means of the header information analysis section 212 (step S40).

If R/N=R, that is, the base station 11 has received some data in the preceding upstream frame (step S40; R), the control section 201 determines whether or not PE contained in the received frame and the CRC computed value of the leading frame data transmitted in the preceding upstream frame in step S35 coincide with each other (step S41).

The determination result "Received PE=Transmitted CRC computed value" (step S41; Yes) means that the base station 11 has normally received the leading frame transmitted in step S35 (R/N=R) and has transmitted the corresponding response. That is, the destination of the data in the downstream frame presently received is this mobile station.

Subsequently, the control section 201 determines whether or not there is any remaining data to be transmitted (step S42). If there is no data to be transmitted (step S42; No), the transmission process is completed.

If there is some remaining data to be transmitted (step S42; Yes), the control section 201 determines whether P/D contained in the received frame is P (continuous transmission permission) or D (continuous transmission non-permission) (step S43). If the determination result is P, the control section 201 changes the operating mode to the transmitting mode and transmits the next frame of data (step S44). The control section 201 thereafter determines whether or not there is any remaining data to be transmitted (step S45). If there is no data to be transmitted (step S45; No), the transmission process is completed.

If there is some remaining data to be transmitted, the control section 201 returns to step S44 and successively transmits data in the next upstream frame. In this case, the transmitting mode is maintained as the operating mode of the mobile station 12.

If the control section 201 determines in step S43 that P/D=D, it receives the next downstream frame by maintaining the receiving mode (step S46) without transmitting any data in the next upstream frame, and determines whether I/B in collision control information in the received frame is I (available) or B (transmission non-permission) (step S47). If the control section 201 determines that I/B=I, that is, the next upstream time is available, it returns to the above-described step S35 to transmit the data in the leading frame.

If the control section 201 determines in step S47 that I/B=B, it determines whether or not the number of times processing results in failure to transmit data has reached the number of times set in advance, i.e., the number of times set in the reservation wait counter 215 (step S48). If the set number of times has not been reached (step S48; Yes), the control section 201 decrements the value of the reservation wait counter 215 by 1 (step S49) and returns to step S46. If the control section 201 determines that the number of times processing results in failure to transmit data has reached the number of times set in advance, i.e., the number of times set in the reservation wait counter 215 (step S48; Yes), it recognizes transmission failure and executes predetermined processing (step S50).

If the result of determination in step S40 is R/N=N, or if the result of determination in step S41 is that the received PE does not coincide with the transmitted CRC value, it indicates that the data in the leading frame transmitted in step S35 has not been normally received by the base station 11 for some reason. That is, R/N=N indicates that the entire data has not been received, and the result that the received PE does not coincide with the transmitted CRC value indicates that data from one of the other mobile stations has been received or the data transmitted in step S35 has been received while some of the contents of data is being erroneously recognized. In this case, the control section 201 determines whether or not the count value of the recycle counter 216, i.e., the number of times the leading frame is transmitted (recycle time), has reached the number of times set in advance (step S51).

If the number of times the leading frame is transmitted has reached the number of times set in advance (step S51; Yes), the control section 201 recognizes transmission failure and performs the predetermined processing (step S39).

If the count value of the recycle counter 216 has not reached the set value, the control section 201 randomly determines a delay time by generating a random number by means of the random delay section 214 in order to again transmit the leading frame, measures the delay time (step S52) and thereafter returns to step S33.

The above-described configurations of the base station 11 and the mobile stations 12 and the above-described random access operation performed between the base station 11 and the mobile stations 12 ensure that even in FDMA in which transmission and reception are continuously performed with respect to time, each mobile station 12 can refer to P/D information indicating whether or not continuous transmission is permitted and can be on standby for transmission. Therefore a sufficient time for control in the base station 11 can be provided and the control process can be simplified.

The mobile station 12 checks whether or not transmission of a transmitted leading frame (or a single frame before a continuous transmission permission is given) has been accepted by the base station 11. If the mobile station 12 determines that the transmission has been accepted, it transmits subsequent data. Therefore, no useless collision occurs between the plurality of mobile stations 12.

Even during the time period for two frames immediately after receiving the leading frame from one mobile station 12, all the mobile stations 12 can transmit data to the base station 11. Therefore the throughput is high.

It is possible to control, with respect to times including the switching time, even the mobile station 12 arranged as a half-duplex type or the like incapable of simultaneously performing transmission and reception.

The essentials of various conditions for execution of the above-described random access control are collectively described below.

1) Preconditions 1-1) A slotted-ALOHA random access control method for mobile communication is used.

1-2) Base station 11 is FDM, while each mobile station is FDMA.

1-3) A transmitting-receiving offset time is set between transmission and reception in the frame structure formed by base station 11 and mobile station 12.

1-4) Collision control information is placed in a frame of downstream control data transmitted from the base station.

1-5) The base station notifies collision control information to all the mobile stations.

1-6) Collision control information includes "availability/inhibition" information (I/B) as to whether or not an upstream frame is available or transmission-inhibited.

1-7) Collision control information includes "reception/non-reception" information (R/N) indicating whether or not an upstream signal has been received by the base station 11.

1-8) Collision control information includes "received data" information (PE) indicating to which mobile station information is destined.

1-9) The mobile station can determine whether or not data transmitted from itself has been normally received by the base station, by analyzing "reception/non-reception" information and "received data" information in collision control information.

1-10) Data transmitted from mobile station 12 includes data indicating the number of frames (e.g., the total number of frame and the number of remaining frames) before the completion of transmission of the entire information.

1-11) "Received data" information is the results of CRC determination made in the base station on frame data transmitted from mobile stations.

2) Conditions in this Embodiment 2-1) Collision control information includes "continuous transmission permission/non-permission" information indicating whether or not continuous transmission of upstream frames is permitted.

2-2) "Availability/inhibition" information in collision control information is information on an upstream frame having the same number as that of the frame through which the collision control information is notified.

2-3) "Reception/non-reception" information in collision control information is information on an upstream signal having the third preceding frame number with respect to the frame number through which the information is notified.

2-4) "Continuous transmission permission/non-permission" information in collision control information is information on an upstream frame having the same frame number as that of the frame through which the information is transmitted.

2-5) "Received data" information in collision control information is information on an upstream signal having the third preceding frame number with respect to the frame number through which the collision control information is notified.

2-6) Mobile station 12 can transmit a single frame (packet) when "availability/inhibition" information designates availability.

2-7) If mobile station 12 determines that a single frame transmitted from itself has been received by the base station, and if "continuous transmission permission/non-permission" information designates continuous transmission permission, mobile station 12 can continuously transmit frames from the next transmission.

2-8) If mobile station 12 determines that a single frame transmitted from itself has been received by the base station, and if "continuous transmission permission/non-permission" information designates continuous non-permission, mobile station 12 can activate the "reservation wait counter" changed on a frame-by-frame basis and can be on standby for transmission before the completion of the operation of the "reservation wait counter".

2-9) After the completion of the operation of the "reservation wait counter", random access failure is recognized and random access is retried.

The above-described operations will be described on the basis of a concrete example.

An example of the operations in a case where one mobile station transmits one frame of data without collision with other mobile stations will first be described with reference to FIG. 7.

Alphabetic letters showing in downstream frames respectively indicated denotations of I/B, R/N, P/D and PE. For example, "I, N, D, 0" entered therein means that I/B=I (an upstream time is available); R/N=N (an upstream signal having the third preceding frame number has not been received); P/D=D (continuous transmission from the next upstream time is not permitted); and the content of PE is 0.

Figure 7:
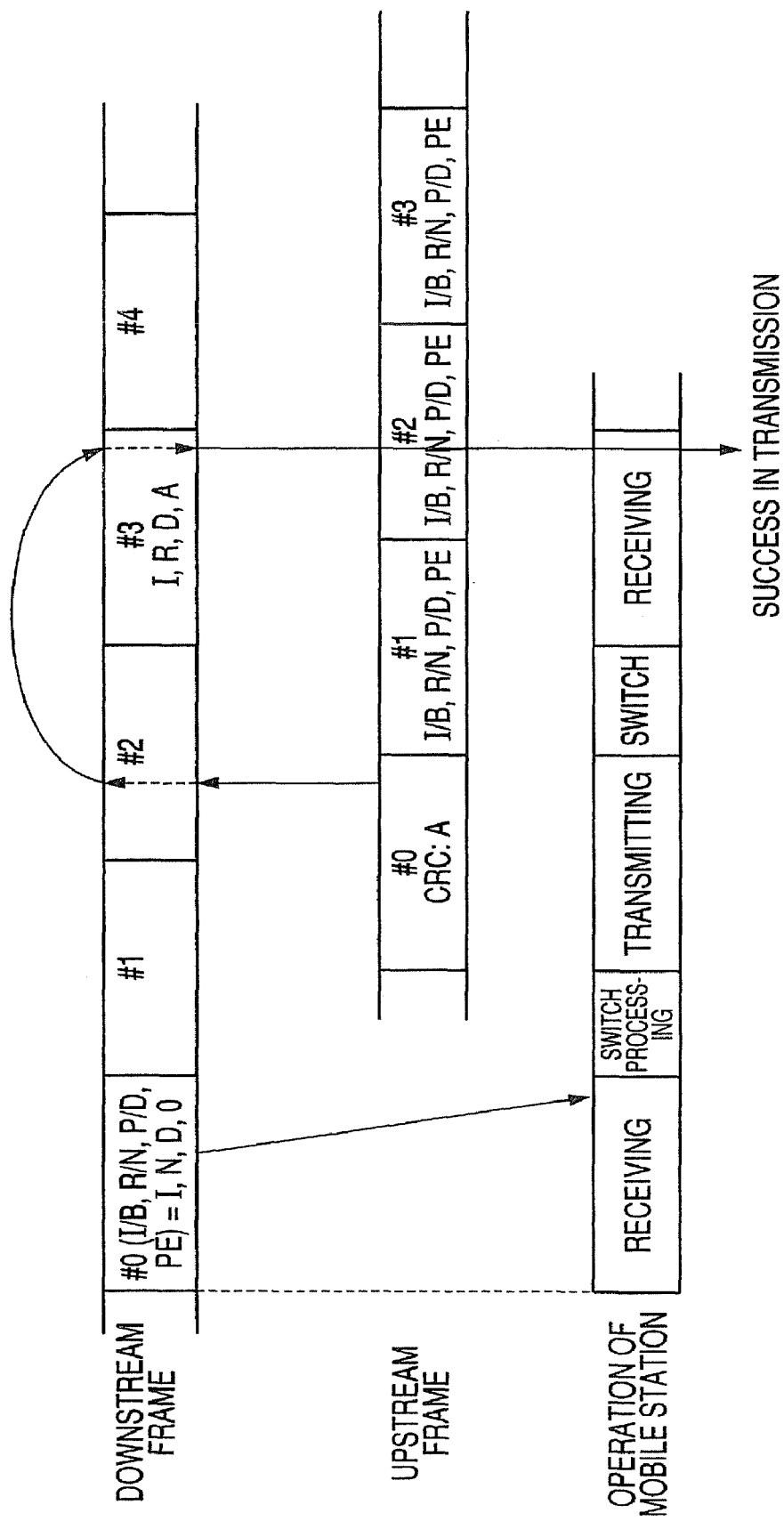
FIG. 7 is a timing chart for explaining an example of the operation of the mobile communication system.

In the example shown in FIG. 7, I/B contained in collision control information received through a downstream frame #0 is I, that is, the upstream frame #0 is available. The control section 201 transmits through the transmitting section 204 information to be transmitted, as well as a CRC result (A). At this time, header information includes the total number of groups of data (the number of slots: 1 in this case).

The base station 11 receives through the antenna 105 the data transmitted from the mobile station 12, restores the data by demodulation in the receiving section 103, and supplies the data to the control section 101.

The control section 101 analyzes the received data and confirms whether the reception has been completed without error, for example, by performing a CRC check. If the reception has been correctly performed, the control section 101 sets R/N in the collision control information to R, sets the result of CRC computation on the received data as PE, and transmits a third downstream frame #3 by containing these information items.

The mobile station 12 receives the downstream frame #3, demodulates and analyzes the received frame and determines from R/N whether or not the base station 11 has succeeded in reception. In the example shown in FIG. 7, the control section 201 determines that the base station 11 has received the data, since R/N is R. Further, the control section 201 determines that the base station 11 has correctly received the data from the information indicating that PE is A and that the CRC on the transmitted data is also A, and thereby knows that the transmission has ended in success.

Figure 8:
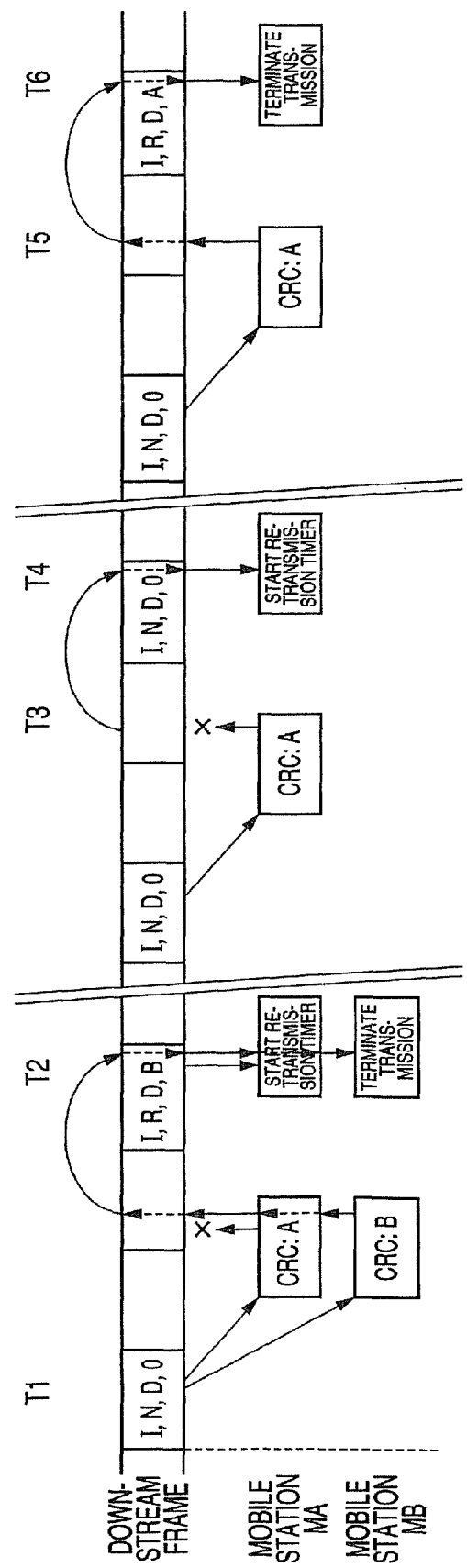
FIG. 8 is a timing chart for explaining an example of the operation of the mobile communication system.

An example of the operations in a case where mobile station 12 transmits one frame of data but a failure to achieve transmission to the base station 12 results due to a transmitted data collision with another mobile station 12 and a certain wireless condition will next be described with reference to FIG. 8.

A situation will be considered in which a mobile station MA receives I/B at a time T1; the received I/B is I; the mobile station MA therefore starts transmission; a mobile station MB also starts transmission simultaneously; collision occurs between the mobile stations; and data from the mobile station MB reaches the base station 11.

The base station 11 sets R/N to R, sets PE to "B", which is the same as the CRC computed value transmitted from the mobile station B, and notifies (transmits) the information at time T2 three frames after.

The mobile stations MA and MB receive collision information at time T2. The mobile station MA determines transmission failure, while the mobile station MB determines transmission success.

Because of transmission failure, the mobile station MA sets a random delay, performs retransmission at time T3, and also ended in failure to achieve transmission to the base station 11 due to a bad wireless condition. Accordingly, the base station 11 notifies information at time T4 by setting R/N to N and PE to 0. The mobile station MA thereby knows transmission failure, again performs retransmission at time T5 after a random delay, and succeeds in transmission at time T6 at which R/N becomes R and CRC in PE becomes "A" as a matching result, thus completing random access.

Figure 9:
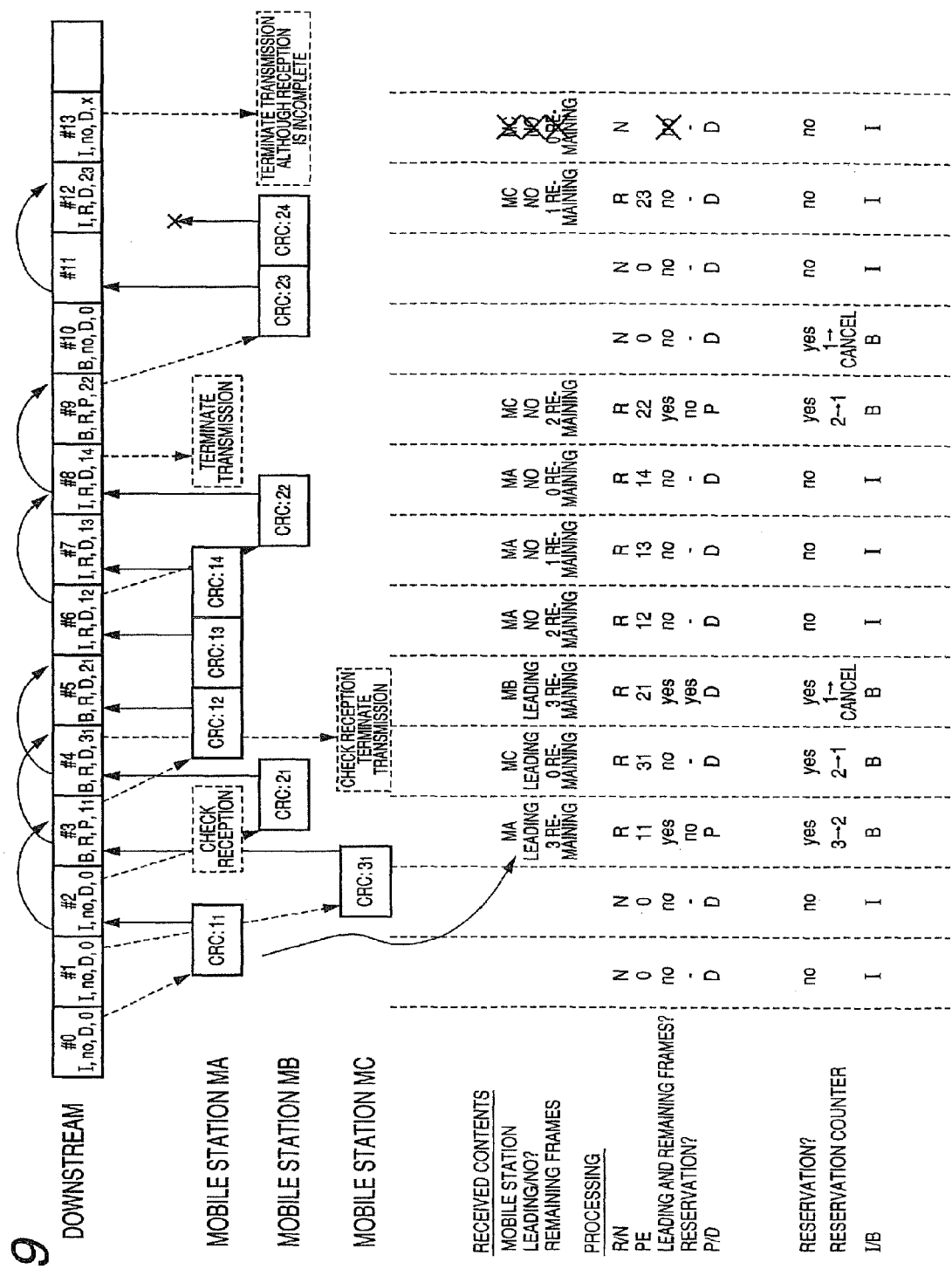
FIG. 9 is a timing chart for explaining an example of the operation of the mobile communication system.

An example of collision control in a case where mobile stations MA and MB transmit four consecutive groups of data will next be described with reference to FIG. 9.

It is assumed that, in this example, when the base station 11 transmits data to a particular mobile station 12, information indicating the mobile station 12 as a destination is included in the transmitted data.

The base station 11 first sets R/N=N and PE=0 in 0th to second frames #0 to #2 since there is no reception event three frames before (step S13), and also sets P/D=P by determining that there is no reservation (step S17).

The mobile station MA has data to be transmitted (step S31 in FIG. 6; Yes), and I/B in the received 0th frame #0 is I (step S34; I). The mobile station MA therefore transmits a leading-frame packet in data packets corresponding to four frames not yet transmitted (step S35). This packet includes, as information in header information, information indicating that the sender is MA, information indicating that the packet is a leading frame, and information indicating that total information length is 4 and there are three remaining frames. Also, $1_1$ is added as CRC information to the header information.

The base station 11 receives and analyzes the data transmitted from the mobile station MA. The base station 11 obtains information including the information indicating that the transmitted data is a leading frame and the information indicating that there are three remaining frames of data, and performs a CRC check (it is assumed that correctness is confirmed from CRC=$1_1$ in this example).

The base station receives the data, confirms correctness by the CRC check, therefore determines Yes in step S11 in FIG. 5, and sets R/N in the third frame #3 to R and sets the CRC value $1_1$ in PE (step S12). Since the received data is a leading frame and since remaining frames exist, the result of determination in step S14 is Yes and determination is made in step S16 as to whether or not there is a reservation. In this example, it is determined that there is no reservation (step S16; No), P/D in the third frame is set to P (step S17) and a reservation condition and the number of remaining frames "3" are set in the reservation counter 115 (step S18).

Determination is thereafter made in step S19 as to whether or not there is a reservation. Since a reservation is set in step S18, the result of determination in step S19 is Yes and the count value of the reservation counter 115 is updated from 3 to 2 (step S23) and I/B=B is set (step S24). Subsequently, the data in the third frame #3 is transmitted (steps S25 and S26). The header information in the third frame #3 includes information for identification of the mobile station MA as a destination.

At a time corresponding to the fourth downstream frame #4, the count value of the reservation counter 115 of the base station 11 is updated from 2 to 1 (step S23), and the reservation is reset with respect to the fifth frame #5 (step S22). Also in the fourth and fifth frames #4 and #5, I/B=B (step S24).

The mobile station MA receives the third downstream frame #3 addressed to itself (step S36). R/N is R (step S40; R), PE coincides with CRC=$1_1$ that the mobile station MA has transmitted (step S41; Yes), and P/D is P (step S43; P). The mobile station MA therefore transmits the remaining three frames of data in the consecutive third, fourth and fifth upstream frames #3, #4, and #5 (steps S44 and S45). By completing transmission of the entire data, the mobile station MA stops transmitting.

A mobile station MC has one frame of data to be transmitted and transmits the data since I/B in the first frame #1 is I.

The base station 11 receives and analyzes the data transmitted from the mobile station MC. The base station 11 obtains information including information indicating that the sender is MC, information indicating that the transmitted data is a leading frame, and information indicating that there is no remaining frame of data, and performs a CRC check (it is assumed that correctness is confirmed from CRC=$3_1$ in this example).

The base station 11 confirms correctness of the received data by the CRC check, therefore determines Yes in step S11 in FIG. 5, and sets R/N in the fourth frame #4 to R and sets the CRC value $3_1$ in PE (step S12).

The received data is a leading frame but no remaining frames exist. Accordingly, the result of determination in step S14 is No and P/D in the fourth frame is set to D in step S15. The reservation counter 115 is in a reservation condition with respect to the third frame (step S19; Yes). The count value of the reservation counter 115 is updated from 2 to 1 (step S23). I/B=B is set (step S24). The fourth frame #4 is transmitted to the mobile station MC (steps S25 and S26).

The mobile station MC receives the fourth downstream frame #4 from the base station 11 (step S36). It is determined that R/N is R and PE=$3_1$ (step S40; R, step S41; Yes). There is no remaining data (step S42; No) and the transmission is completed.

The mobile station MB also has data to be transmitted (step S31 in FIG. 6; Yes), and I/B in the received second frame #2 is I (step S34; I). The mobile station MB therefore transmits a leading-frame packet (step S35). This packet includes, in the header, information indicating that the packet is a leading frame, and information indicating that total information length is 4 and there are three remaining frames. Also, $2_1$ is added as CRC information.

The base station 11 receives and analyzes the data transmitted from the mobile station MB. The base station 11 obtains information including the information indicating that the transmitted data is a leading frame and the information indicating that there are three remaining frames of data, and performs a CRC check (it is assumed that correctness is confirmed from CRC=$2_1$ in this example).

The base station 11 receives the data, confirms correctness by the CRC check, therefore determines Yes in step S11 in FIG. 5, and sets R/N in the fifth frame #5 to R and sets the CRC value $2_1$ in PE (step S12). Since the received data is a leading frame and since remaining frames exist, the result of determination in step S14 is Yes and determination is made in step S16 as to whether or not there is a reservation. In this example, there is a reservation (step S16; Yes), P/D in the fifth frame is set to D (step S15). Determination is subsequently made as to whether a reservation condition is set in the reservation counter 115 (step S19). In this example, there is a reservation (step S19; Yes), and the value of the reservation counter 115 is "1" (step S21; =1). Accordingly, the reservation is canceled (step S22), I/B=B is set (step S24) and the fifth frame is transmitted to the mobile station MB.

The mobile station MB receives the fifth downstream frame #5 (step S36). R/N is R (step S40; R), PE coincides with CRC=$2_1$ that the mobile station MB has transmitted (step S41; Yes). There are remaining frames (step S42; Yes). P/D is therefore determined (step S43). Since P/D is D, the next frame, i.e., the sixth frame #6, is received in step S46.

I/B in the sixth frame #6 is IB=I. Accordingly, the process returns to step S35, the data in the leading frame in the remaining data is transmitted, and the value of the recycle counter is incremented by 1. In this example, since one frame of data has been transmitted in the second frame #2, the data in the second frame, i.e., the leading frame in the remaining three frames of data, is transmitted.

The base station 11 receives the data transmitted from the mobile station MB, obtains information including the information indicating that the transmitted data is a leading frame and the information indicating that there are three remaining frames of data, and performs a CRC check (it is assumed that correctness is confirmed from CRC=$2_2$ in this example).

The base station determines Yes in step S11 in FIG. 5, and sets R/N in the ninth frame #9 to R and sets the CRC value $2_2$ in PE (step S12). Further, Yes is determined in step S14, it is determined in step S16 that there is no reservation (step S16; No), and P/D is set to P (step S17). Subsequently, the number of remaining frames "2" is set in the reservation counter 115 (step S18).

Determination is thereafter made in step S19 as to whether or not there is a reservation. Since a reservation is set in step S18, the result of determination in step S19 is Yes and the count value of the reservation counter 115 is updated from 2 to 1 (step S23). I/B=B is set (step S24) and the data in the third frame #3 is transmitted (steps S25 and S26).

The mobile station MB receives the ninth frame #9 from the base station 11 in step S36, R/N=R, PE=$2_2$ as a matching result, and the received P/D is P (step S43; P). The mobile station MB therefore transmits the ninth and tenth frames #9 and #10 (steps S44 and S45).

Even if the data in the fourth frame in the data to be transmitted is not normally received for some reason, the present data transmission by the mobile station MB can be terminated, as shown in the figure.

The present invention is not limited to the above-described embodiment. Various modifications and applications are possible. For example, while the embodiment has been described with respect to the case where the mobile stations 12 are of a half-duplex type, random access control in accordance with the present invention can also be applied, without being modified, to a network in which only full-duplex mobile stations or both full-duplex and half-duplex mobile stations exist.

While a 1.5-frame period is mentioned above as the delay time by which upstream frames are delayed with respect to downstream frames, the delay time may be set to any time period longer than the one-frame period according to the processing capacity of the mobile station 12. For example, it may be set to a 1.2 frame period, a 2.5-frame period, a 3.5-frame period or a 3-frame period. The base station 11 sets information with respect to each of frame periods for downstream frames as required according to this frame delay setting.

While the embodiment has been described with respect to a form based on the ICMA-PE method, it is not necessary to definitely specify each of the collision control information items I/B, R/N, and P/D. For example, different states such as a "state 1" in which all mobile stations can perform transmission, a "state 2" in which a particular one of the mobile stations is permitted to perform continuous transmission, and a "state 3" in which a particular one of the mobile stations is continuously performing transmission may be defined.

In the embodiment, in a case where the amount of communication traffic is large and where the base station 11 should disperse continuous transmission by mobile stations 12 with respect to time, the base station 11 can disperse continuous transmission by the mobile stations 12 with respect to time by designating D as P/D and by setting the "reservation wait counter" to a suitable value according to a direction from the base station 11.

For example, the base station 11 may perform control by setting P/D to D when the base station 11 should inhibit continuous transmission from the mobile stations 12 in a situation where the amount of traffic is large, and may perform control by unexceptionally setting P/D to P if continuous transmission can be permitted in a situation where the amount of traffic is small.

Figure 10:
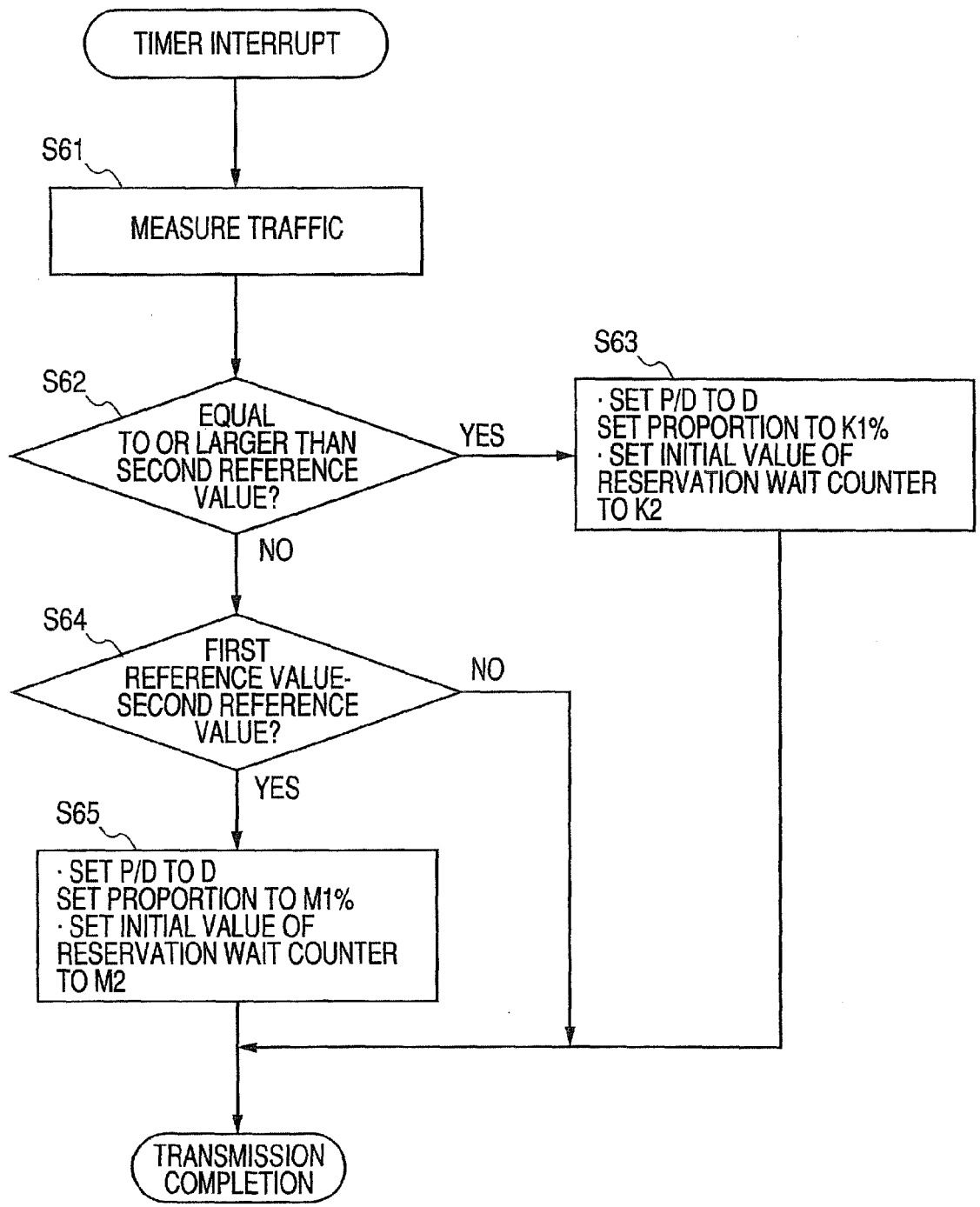
FIG. 10 is a flowchart for explaining an example of application of the operation of the base station.
Figure 11:
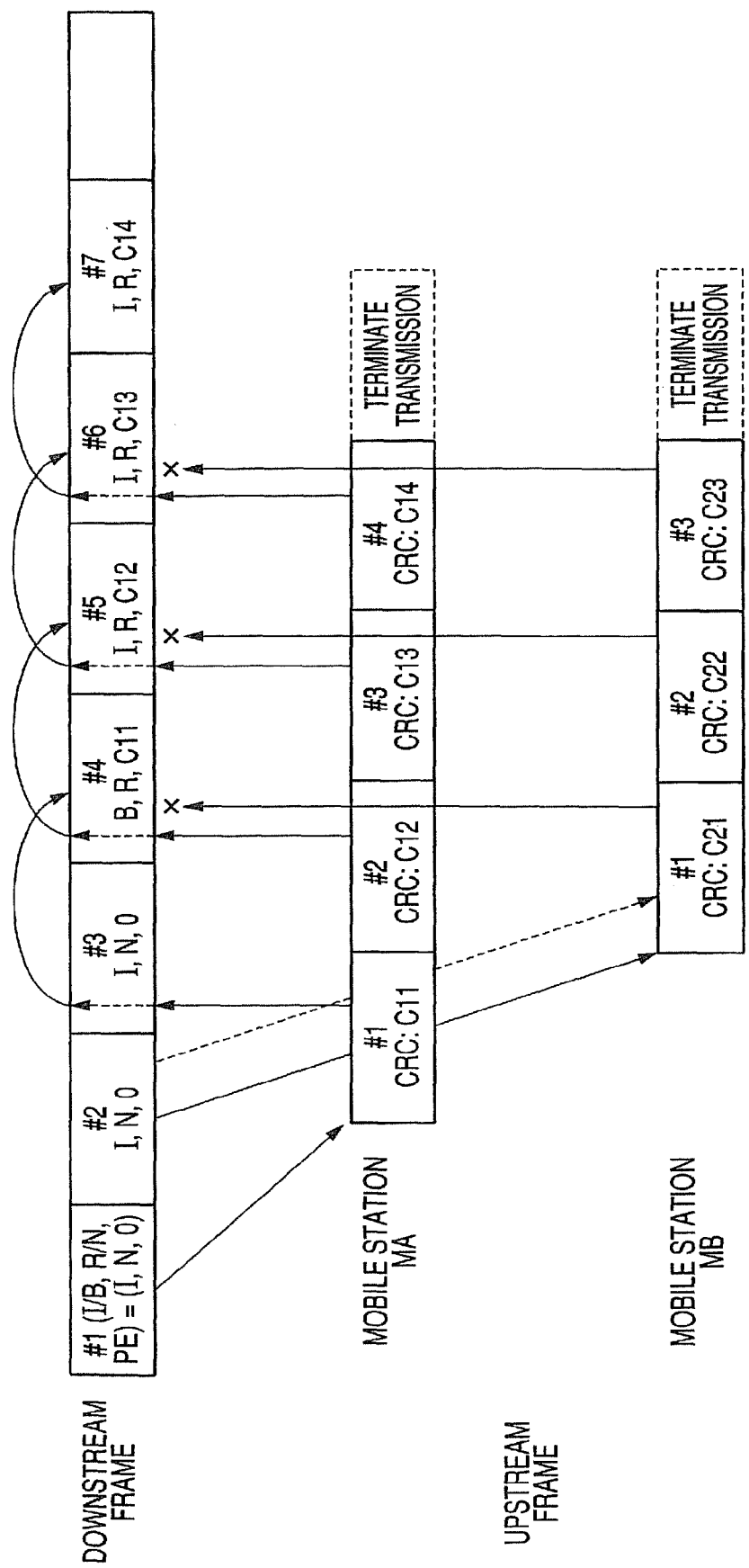
FIG. 11 is a timing chart for explaining an example of the operation of a conventional mobile communication system.
Figure 12:
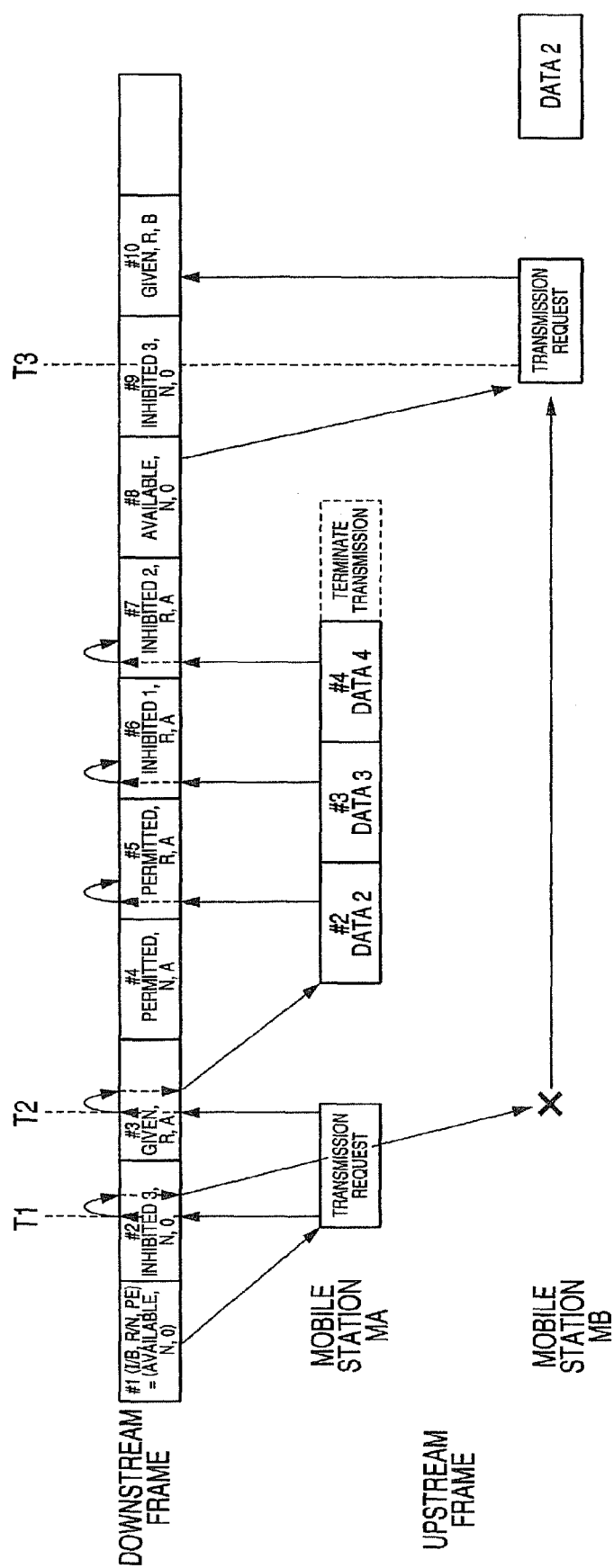
FIG. 12 is a timing chart for explaining an example of the operation of a conventional mobile communication system.

For example, referring to FIG. 10, traffic is measured (step S61). When the measured amount of traffic is larger than a second reference amount (step S61; Yes), the proportion of D in P/D is set to K1% and the initial value of the reservation wait counter is set to K2 (step S63).

When the measured amount of traffic is within the range from a first reference amount to the second reference amount (step S62; No, step S64; Yes), the proportion of D in P/D is set to M1% and the initial value of the reservation wait counter is set to M2 (K1>M1, K2>M2; step S65). When the amount of traffic is smaller than the first reference amount (steps S62 and S64; No), the traffic may be left without being controlled.

A program for enabling ordinary base station and mobile stations to perform the above-described random access control may be prepared and installed in the ordinary base station and mobile stations to execute.

What is claimed is:

1. A base station for use in a mobile communication system in which communication is performed by a slotted-ALOHA method, wherein a predetermined offset time is set between downstream communication frames from the base station to a mobile station and upstream communication frames from the mobile station to the base station, the base station comprising:

transmission permission signal transmitting means of transmitting, through a predetermined frame in the downstream communication frames, a transmission permission signal for permitting transmission of one frame of data when one of the upstream communication frames is available;

receiving means of receiving one frame of data transmitted from the mobile station through one of the upstream communications frames corresponding to the predetermined frame; and continuous transmission permission signal transmitting means of determining whether or not continuous transmission of subsequent two or more frames of data should be permitted if the subsequent frames of data exists subsequently to the received one frame of data, and transmitting through the downstream communication frame a continuous transmission permission signal for permission of the continuous transmission when the continuous transmission is permitted, wherein the upstream communication frames from the mobile station to the base station are delayed from the downstream communication frames from the base station to the mobile station by a predetermined time period longer than one frame, and wherein the transmission permission signal is transmitted through the frame in the downstream communication frames corresponding to the first frame in the upstream communication frames if the first frame in the upstream communication frames is available.

2. The base station according to claim 1, wherein information as to whether or not one frame of data has been normally received from the mobile station is transmitted together with the continuous transmission signal, and wherein the mobile station identification information for identification of one of the mobile stations is transmitted together with the continuous transmission permission signal.

3. The base station according to claim 2, wherein a transmission inhibition signal for inhibiting data transmission from the other mobile stations is transmitted during transmission of the subsequent data by the mobile station on the basis of the number of frames of the subsequent data notified from the mobile station, and a continuous transmission non-permission signal is transmitted when it does not permit continuous transmission of data subsequent to the one frame of data, and wherein the base station further comprises means of determining whether or not the continuous transmission should be permitted on the basis of a condition of traffic.

4. A mobile station for use in a mobile communication system in which communication is performed by a slotted-ALOHA method, wherein a predetermined offset time is set between downstream communication frames from a base station to the mobile station and upstream communication frames from the mobile station to the base station, the mobile station comprising:

transmission permission signal receiving means of receiving a transmission permission signal from the base station;

leading data transmitting means of transmitting one frame of leading data through one of the upstream communication frames in response to the transmission permission signal if the data to be transmitted exists;

continuous transmission permission signal receiving means of receiving one of the downstream communication frames subsequently to transmission of the leading data to receive a continuous transmission permission signal; and continuous transmission means of continuously transmitting data subsequent to the leading data through a plurality of frames in the upstream communication frames in response to the continuous transmission permission signal, wherein the continuous transmission permission signal is received, it transmits the subsequent data through the consecutive frames without checking whether or not the base station has succeeded in reception.

5. The mobile station according to claim 4, wherein there is a half-duplex-type configuration capable of selectively executing transmission processing and reception processing, and wherein when the transmission permission signal is received in a receiving mode, and if data to be transmitted exists, it transmits the one frame of data in the upstream communication frame by selecting a transmitting mode in place of the receiving mode, thereafter receives the downstream communication frame by selecting the receiving mode, and, when receiving the continuous transmission permission signal, continuously transmits the subsequent data through the plurality of frames in the upstream communication frames by selecting the transmitting mode.

6. The mobile station according to claim 5, wherein if the transmission permission signal cannot be transmitted during a predetermined time period in a case where it has data to be transmitted, it recognizes transmission failure, sets a delay time, and again executes processing for awaiting reception of the transmission permission signal after a lapse of time through the delay time.

7. The mobile station according to claim 6, wherein it is decided whether or not the base station has received the one frame of data transmitted from the mobile station, keeps on standby for transmission of the subsequent data after a lapse of a predetermined frame period if it determines that the base station has received the data, and if it has received the continuous transmission non-permission signal, and transmits the leading one frame of data in the subsequent data if it receives the transmission permission signal during standby.

* * * * *